(12) United States Patent
Menezes Ferreira et al.

(10) Patent No.: US 12,512,697 B2
(45) Date of Patent: Dec. 30, 2025

(54) CONTROL PROCESS FOR LOW VOLTAGE MICROGRIDS WITH DISTRIBUTED COMMUNICATION

(71) Applicants: Universidade Federal De Minas Gerais, Belo Horizonte (BR); Petróleo Brasileiro S.A.—Petrobras, Rio de Janeiro (BR)

(72) Inventors: Daniele Menezes Ferreira, Belo Horizonte (BR); Sidelmo Magalhães Silva, Belo Horizonte (BR); Danilo Iglesias Brandão, Belo Horizonte (BR)

(73) Assignees: Universidade Federal De Minas Gerais, Belo Horizonte (BR); Petróleo Brasileiro S.A.—Petrobras, Rio de Janeiro (BR)

( * ) Notice: Subject to any disclaimer, the term of this patent is extended or adjusted under 35 U.S.C. 154(b) by 398 days.

(21) Appl. No.: 18/177,872

(22) Filed: Mar. 3, 2023

(65) Prior Publication Data

US 2023/0291229 A1 Sep. 14, 2023

(30) Foreign Application Priority Data

Mar. 11, 2022 (BR) ...................... 10 2022 004556 9

(51) Int. Cl.
  *H02J 13/00* (2006.01)
  *G05B 17/02* (2006.01)
  *H02J 3/38* (2006.01)

(52) U.S. Cl.
  CPC ........ *H02J 13/00002* (2020.01); *G05B 17/02* (2013.01); *H02J 3/381* (2013.01)

(58) Field of Classification Search
  CPC ......... H02J 13/00002; H02J 3/381; H02J 3/46
  See application file for complete search history.

(56) References Cited

U.S. PATENT DOCUMENTS

| 10,903,654 | B2 * | 1/2021 | Zimmanck | .............. H02J 3/381 |
| 2011/0035073 | A1 * | 2/2011 | Ozog | ............... G06Q 10/06315 |
| | | | | 700/291 |

(Continued)

OTHER PUBLICATIONS

Caldognetto et al. (Dec. 2015) "Power-Based Control of Low-Voltage Microgrids", IEEE Journal of Emerging and Selected Topics in Power Electronics, 3(4):1056-1066.

(Continued)

*Primary Examiner* — Nicholas Klicos
(74) *Attorney, Agent, or Firm* — Morrison & Foerster LLP

(57) ABSTRACT

This technology refers to a control process for low voltage microgrids with distributed communication, the process is based on two techniques: "Power-Based Control" (PBC) and "consensus protocol" (CP). The proposed technology resorts to PBC and CP techniques to take advantage of the combination of their technical features, achieving low implementation complexity and concomitantly providing the following technical effects: 1) precise sharing of active power and reactive power proportionally to the capacity of distributed generators (GDs) at the MR; 2) control of the flow of active power and reactive power between the different phases of the MRs; 3) Current unbalance compensation at the point of common coupling (PAC); in addition to other advantages. The technology is applied in the technical field of equipment and infrastructure for microgrids (MRs) of distributed generators (GDs).

7 Claims, 10 Drawing Sheets

(56) References Cited

U.S. PATENT DOCUMENTS

| | | | | |
|---|---|---|---|---|
| 2014/0252855 A1* | 9/2014 | Watanabe | ............... | H02J 3/381 |
| | | | | 307/31 |
| 2015/0054339 A1* | 2/2015 | Zhao | ......................... | H02J 3/16 |
| | | | | 307/24 |
| 2016/0233682 A1* | 8/2016 | Do Rosario | ............ | H02J 3/003 |
| 2017/0117713 A1* | 4/2017 | Majumder | ................ | H02J 7/34 |
| 2017/0317498 A1* | 11/2017 | Guo | ....................... | G05B 15/02 |
| 2022/0077688 A1* | 3/2022 | Patarroyo | ................. | H02J 3/46 |

OTHER PUBLICATIONS

Manjunath et al. (Dec. 21-23, 2017) "Performance Assessment of Different Droop Control Techniques in an AC Microgrid", International Conference on Power Systems (ICPS), 93-98.

Olfati-Saber et al. (Jan. 2007) "Consensus and Cooperation in Networked Multi-Agent Systems", Proceedings of the IEEE, 95(1):215-233.

Ferreira et al. (Mar. 15, 2021). "Distributed Control Strategy for Low-Voltage Three-Phase Four-Wire Microgrids: Consensus Power-Based Control," IEEE Transactions on Smart Grid 12(4): 3215-3231.

\* cited by examiner

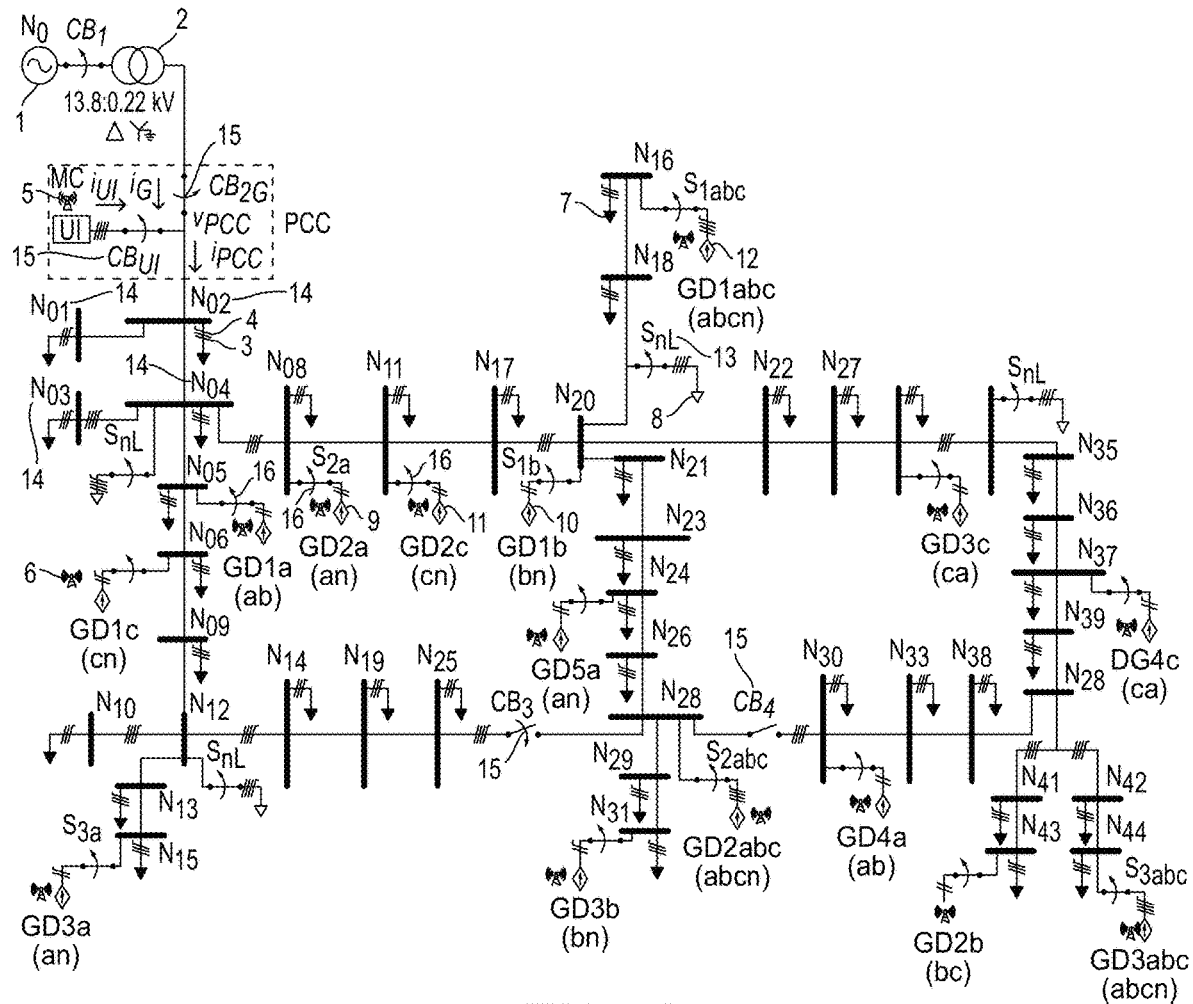
FIG. 1
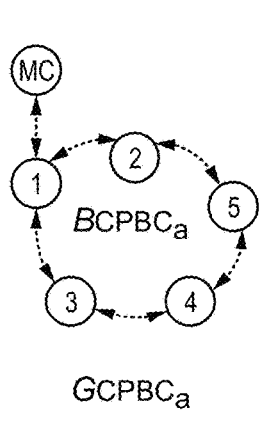 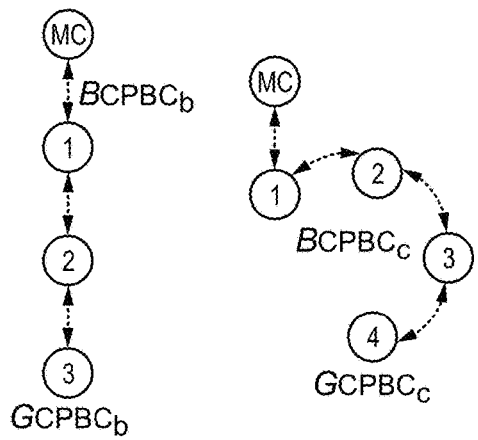 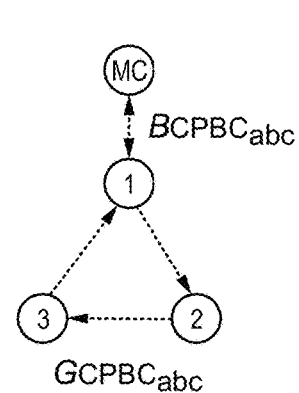
FIG. 2A  FIG. 2B  FIG. 2C  FIG. 2D

$$\alpha_{P_{1\emptyset}}(l+1) = \frac{P_G(l) + P_{UI}(l) + \Sigma_1^{n_{1\emptyset}} P_i(l) - P_G^*(l+1)}{\Sigma_1^{n_{1\emptyset}} P_{max_i}(l)} \quad (1)$$

$$\alpha_{Q_{1\emptyset}}(l+1) = \frac{Q_G(l) + Q_{UI}(l) + \Sigma_1^{n_{1\emptyset}} Q_i(l) - Q_G^*(l+1)}{\sqrt{\Sigma_1^{n_{1\emptyset}} A_{inv_i}(l)^2 - \Sigma_1^{n_{1\emptyset}} P_i(l)^2}} \quad (2)$$

$$\alpha_{P_{3\emptyset}}(l+1) = \frac{P_G(l) + P_{UI}(l) + \Sigma_1^{n_{1\emptyset.3\emptyset}} P_i(l) - P_G^*(l+1)}{\Sigma_1^{n_{1\emptyset.3\emptyset}} P_{max_i}(l)} \quad (3)$$

$$\alpha_{Q_{3\emptyset}}(l+1) = \frac{Q_G(l) + Q_{UI}(l) + \Sigma_1^{n_{1\emptyset.3\emptyset}} Q_i(l) - Q_G^*(l+1)}{\sqrt{\Sigma_1^{n_{1\emptyset.3\emptyset}} A_{inv_i}(l)^2 - \Sigma_1^{n_{1\emptyset.3\emptyset}} P_i(l)^2}} \quad (4)$$

$$\alpha_{P_i}(l+1) = \alpha_{P_i}(l) + \varepsilon \sum_{j=1}^{n} a_{ij} (\alpha_{P_j}(l) - \alpha_{P_i}(l) + b_i(\alpha_{P_L}(l) - \alpha_{P_i}(l))) \quad (5)$$

$$\alpha_{Q_i}(l+1) = \alpha_{Q_i}(l) + \varepsilon \sum_{j=1}^{n} a_{ij} (\alpha_{Q_j}(l) - \alpha_{Q_i}(l) + b_i(\alpha_{Q_L}(l) - \alpha_{Q_i}(l))) \quad (6)$$

$$Q_{max_i} = \sqrt{A_{inv_i}^2 - P_i^2} \quad (7)$$

$$P_i^* = \alpha_P(l+1) \cdot P_{max_i} \quad (8)$$

$$Q_i^* = \alpha_Q(l+1) \cdot Q_{max_i} \quad (9)$$

FIG. 4

CONTROL PROCESS FOR LOW VOLTAGE MICROGRIDS WITH DISTRIBUTED COMMUNICATION

CROSS-REFERENCE TO RELATED APPLICATION

This application claims priority to Brazilian Application No. 10 2022 004556 9, filed on Mar. 11, 2022, and entitled "CONTROL PROCESS FOR LOW VOLTAGE MICROGRIDS WITH DISTRIBUTED COMMUNICATION," the disclosure of which is incorporated herein by reference in its entirety.

This technology refers to a control process for low voltage microgrids (MRs) with distributed communication. The process is based on two techniques: "Power-Based Control" (PBC) and "consensus protocol" (CP). The proposed technology resorts to PBC and CP techniques to take advantage of the combination of their technical features, achieving a low implementation complexity and concomitantly providing the following technical effects: 1) precise sharing of active power and reactive power proportionally to the capacity of the distributed generators (GDs) at the MR; 2) control of the active power and reactive power flow between the different phases of the MR; 3) current unbalance compensation at the point of common coupling (PAC); in addition to other advantages. The technology is applied in the technical field of equipment and infrastructure for GD microgrids.

The PBC secondary control strategy offers a simple implementation that provides the sharing of active and reactive power proportionally to the capabilities of the existing GDs, in addition to controlling the power flow in the grid and compensating the PAC unbalance, without the need for the prior knowledge of grid parameters or the combination of other techniques, through a simple algebraic formulation. However, for this strategy to work properly, there is still an unwanted dependence on centralized communication, which impacts the MR scalability, system reliability and flexibility, and associated costs (T. Caldognetto, S. Buso, P. Tenti, and D. I. Brandao, "," IEEE J. Emerg. Sci. Topics Power Electron., vol. 3, no. 4, pp. 1056-1066 December 2015).

A solution for networked multi-agent systems, presented by Olfati-Saber et al. (2007), offers algorithms that achieve fast agreement and effective task performance in self-organized networked multi-agent systems. In this proposal, a theoretical model is used for the analysis of consensus algorithms for multi-agent grid systems, with emphasis on the role of information flow, robustness in face of changes in the grid topology due to failures in nodes and connections, time delays in communication and performance assurances of these systems (R. Olfati-Saber, J. A. Fax, and R. M. Murray, "Consensus and Cooperation in Networked Multi-Agent Systems," Proceedings of the IEEE, vol. 95, no. 1, pp. 215-233, 1 2007. [Online]. Available: http://ieeexplore.ieee-.org/document/4118472/). This technology, as well as other technologies based on CP, when applied in the technical field of three-phase low voltage microgrids, present as main deficiencies the absence of control of the flow of active power and reactive power and current unbalance in the PAC.

For the proposed process "Consensus Power-Based Control" (CPBC), a formulation was adapted for the problem called "leader following problem", which is based on external signals dictated by the root node, which, in the implementation used as an example, is associated with the master control (MC). Such a formulation considers a linear system with a first-order integral, which can be analyzed in FIG. 4, which displays expressions (5) and (6). This approach is based on an adaptation conceived by inventors of the process proposed here based on the work of Olfati-Saber et al. (2007), in which the stability conditions involved in multi-agent systems connected in a grid are also analyzed. The essential conditions are: 1) strongly connected graph and 2) restrictions for the value $\epsilon$ (size of the increment in a given iteration of a control loop "1") based on the maximum degree matrices of the grid and the adjacency matrix.

There is no technology in the state of the art that resembles the invention proposed in this patent application, which presents a control process for low voltage microgrids with distributed communication based on "Power-Based Control" (PBC) and "consensus protocol" (CP). The proposed technology resorts to PBC and CP techniques to take advantage of the combination of their technical features, achieving a low implementation complexity and concomitantly providing the following technical effects: 1) precise sharing of active power and reactive power proportionally to the capacity of distributed generators (GDs); 2) control of the flow of active power and reactive power between the different phases of the MRs; 3) current unbalance compensation at the point of common coupling (PAC); among other advantages.

The proposed technology also brings numerous other technical contributions. For example, the combination of PCB and CP techniques is provided by a unique strategy, through a low-complexity distributed control, without the need for "droop" control or additional associated techniques, maintaining flexibility in the choice of communication structure, provided that basic stability conditions are met. "Droop" type control is based on voltage and frequency control in converters in voltage control mode, where power sharing is related to "droop" coefficients, as described by Manjunath and Sarkar (2018) (K. Manjunath and V. Sarkar, "Performance assessment of different droop control techniques in an AC microgrid," 2017 7th International Conference on Power Systems, ICPS 2017, pp. 93-98, 2018).

The technical/theoretical contributions of the developed CPBC technology ("Consensus Power-Based Control") to strategies based on consensus protocol are also highlighted: 1) analysis in steady state and stability analysis of the consensus protocol in discrete time, considering systems of first-order integrators, by means of the evaluation of characteristics of the system eigenvalues; 2) independence of grid parameters and other controls, as well as dynamics of the converters involved, provided that they are controlled by current; 3) to achieve the aforementioned benefits, additional methods are not necessary, usually applied in other proposals in the literature, such as: virtual impedance technique, decomposition of sequence components, etc., wherein this feature allows maintaining low complexity in the formulation of the proposed control; 4) suitable for any type of primary control of GDs, provided that they are controlled by current; 5) it can be applied both to single-phase and three-phase converters, arbitrarily connected between phases or between phase and neutral, which is a relevant feature in some electrical systems, as it is in Brazil; 6) improved MR scalability, due to the distributed communication structure; 7) greater flexibility in choosing the communication topology, which can be made according to the design priorities; 8) satisfactory results in different operational conditions of the MR, such as: grid connected mode (GC, "grid connected"), islanded mode (IS, "islanded"), in face of communication failures, communication delays, converters with different generation capacities, connection process and random disconnection of controlled generators ("plug-and-play capability"); 9) possibility of considerable improvement in the reliability of the operation of the MR depending on the adopted communication topology.

The CPBC process proposed herein does not require detailed information about the MR (for example, line impedances or topology), and unlike many approaches that use the CP technique applied in MRs, the CPBC process does not require details of the primary control (for example, details of converter dynamics, current control, circuit for phase capture loop or "Phase-Locked Loop" or PLL, etc.), which commonly add complexities to the formulation, such as high order dynamics of integrators and nonlinearities.

Thus, the CPBC, in a simple way, only demands the exchange of information between the units, which can be easily represented by means of an updating law based on a first-order integral.

BRIEF DESCRIPTION OF THE FIGURES

In the figures, the studied three-phase four-wire system obeys the red, green, blue and lilac color pattern that were used for identification and reference for phases a ($ph_a$), b ($ph_b$) and c ($ph_c$), respectively. Neutral was indicated with the reference "neut".

FIG. 1 shows, in a non-limiting way, a representation of a three-phase four-wire low voltage microgrid (MR), in which the proposed control process (CPBC) for three-phase four-wire low voltage MRs will be applied based on two techniques: "Power-Based Control" (PBC) and "consensus protocol" (CP). The following elements are indicated in the figure: the main grid (1), transformer (2), indication of the line conductors (3), indication of the neutral conductors (4), communication unit of the master control or MC (5), communication unit of the distributed generators (GDs), indicated in the figure as GD (6), load (7), non-linear load (8), distributed generator of phase "a" (9) represented in red, distributed generator of phase "b" (10) represented in green, distributed generator of phase "c" (11) represented in blue, distributed generator connected to phases "a", "b" and "c" (12) represented in lilac, $S_{nL}$ switches for connecting non-linear loads (13), grid nodes (14) represented with the letter "N" followed by a numerical identification, operational switches (15) represented with the letters "CB", switches S for connection of the GDs (16), a three-phase central converter called utility interface (UI), and a master control unit (MC).

FIG. 2A presents a representation of the microgrid (MR) in a graph form, which corresponds to the $G_{CPBCa}$ phase defined in FIG. 1 and the single-phase GDs are connected to phase "a".

FIG. 2B presents a representations of the microgrid (MR) in a graph form, which corresponds to the $G_{CPBCb}$ phase defined in FIG. 1 and the single-phase GDs are connected to phase "b".

FIG. 2C presents a representations of the microgrid (MR) in a graph form, which corresponds to the $G_{CPBCc}$ phase as defined in FIG. 1 and the single-phase GDs are connected to phase "c".

FIG. 2D presents a representation of the microgrid in a graph form, which corresponds to the $G_{CPBCabc}$ phase as defined in FIG. 1 and the three-phase GDs are connected to phases "a, b and c". The GDs are represented at the vertices of the graphs by their respective numerical indications. $B_{CPBC}$ is a subgraph of $G_{CPBC}$ with the vertices connected directly to the leader node or master control (MC) node.

FIG. 4 presents, in a non-limiting way, the formulation of the PBC technique adapted to the context of the proposed CPBC technology. In FIG. 4, equations (1), (2), (3), (4), (5), (6), (7), (8), (9) are defined. Equations (1), (2), (3), (4) are for the following calculations, respectively: calculation of the coefficient ($\alpha_{P1\phi}$) of proportionality of the active power contribution (P) provided by each phase of the MR through its GDs in a single-phase configuration (1$\phi$), calculation of the coefficient ($\alpha_{Q1\phi}$) of proportionality of the reactive power contribution (Q) provided by each phase of the MR through its GDs in a single-phase configuration (1$\phi$), calculation of the coefficient ($\alpha_{P3\phi}$) of proportionality of the active power contribution (P) provided by each phase of the MR through its GDs in a three-phase configuration (3$\phi$) and calculation of the coefficient ($\alpha_{Q3\phi}$) of proportionality of the contribution of reactive power (Q) provided by each phase of the MR through its GDs in a three-phase configuration (3$\phi$). The identification of the other variables present in equations (1), (2), (3) and (4) is: $P_G$, Active power supplied by the main grid (1) measured at the PAC on the main grid side; $Q_G$, Reactive power supplied by the main grid (1) measured at the PAC on the grid side; $P_{UI}$, Active power measured at the output of the three-phase central converter (UI); $Q_{UI}$, Reactive power measured at the output of the three-phase central converter (UI); $P_i$, Active power measured at the output of each GD; $Q_i$, Reactive power measured at the output of each GD; n, number of MR active nodes (the GDs); i, identification of MR active nodes (plurality of GDi); $\phi$, identification of the number of phases considered in the calculation of the coefficient of proportionality (for example: 1$\phi$=single-phase; 3$\phi$=three-phase; 1$\phi$, 3$\phi$=single-phase and three-phase); "1" is the control cycle; $P_{maxi}$ is the maximum active power provided by the GDi; $A_{invi}$ is the nominal power of the converter of each GDi; $P_G^*$ is the active power reference obtained from the main grid (1) to carry out the MR active power dispatch; $Q_G^*$ is the reactive power reference obtained from the main grid (1) to carry out the MR reactive power dispatch; Equations (5) and (6) are for the following calculations: coefficients of proportionality $\alpha_{Pi}(l+1)$ and $\alpha_{Qi}(l+1)$ of the active and reactive power contribution, respectively, provided by each GDi individually, as a result of the application of the consensus protocol (CP); the identification of the variables present in equations (5) and (6) that have not yet been presented is: $a_{ij}$ represents the adjacency between two nodes i and j, where i, j∈{1, 2, 3 . . . n}; $\epsilon$ is the size of the increment in a given iteration of a control cycle "1"; $b_i$ indicates whether a given GD is directly linked to the leader node or MC node ($b_i$=1) or not ($b_i$=0); $\alpha_{Pj}$ and $\alpha_{Qj}$ are coefficients of proportionality to the active and reactive power contribution provided by each adjacent $GD_i$ and $GD_j$, respectively. Equations (7), (8) and (9) are for the following calculations: maximum reactive power ($Q_{maxi}$) of each GDi, we have the active power of each GDi individually ($Pi^*$) and reactive power of each GDi individually ($Qi^*$).

" in FIG. 14A).

" in FIG. 14B).

DETAILED DESCRIPTION OF THE TECHNOLOGY

Figure 3:
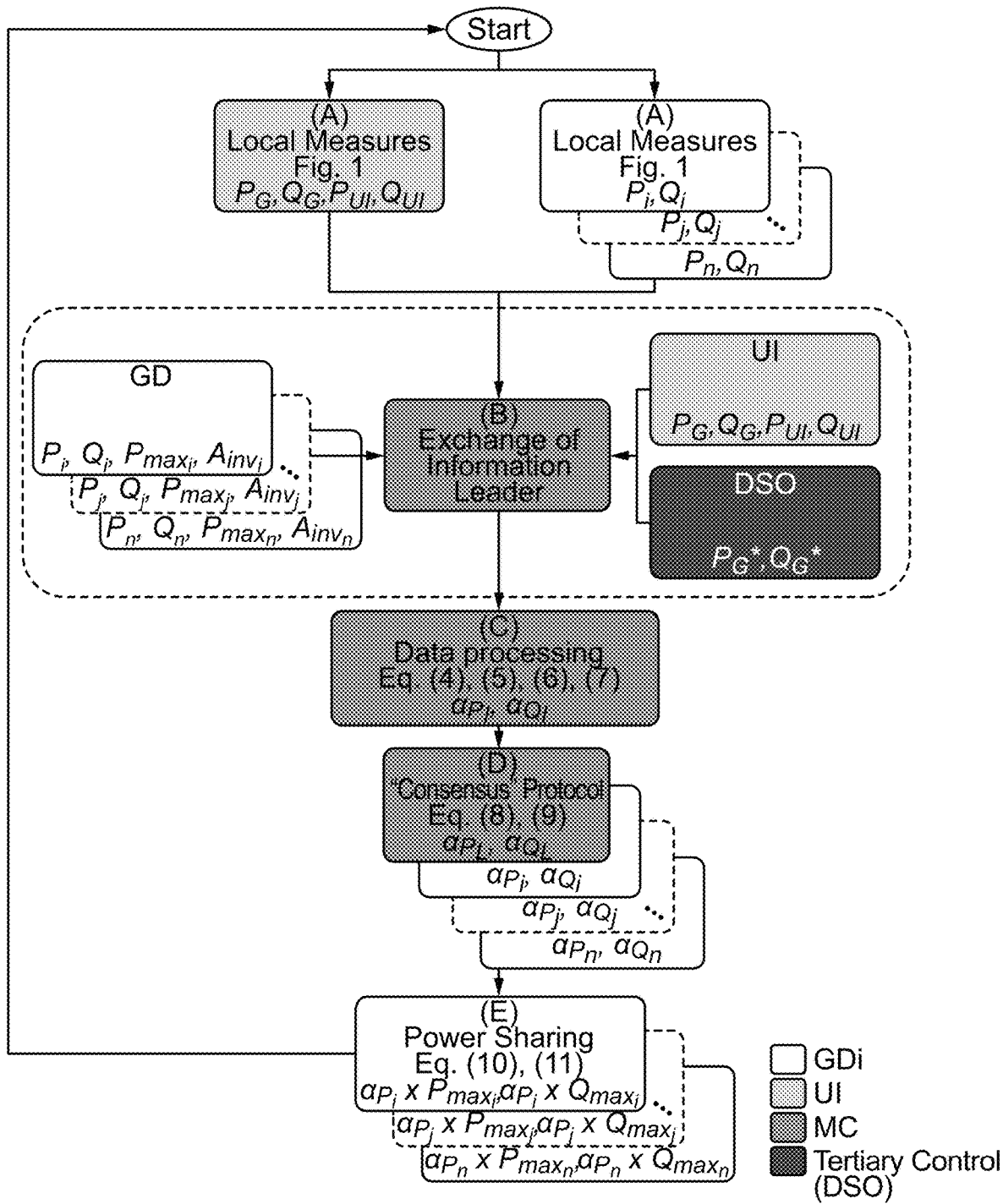
FIG. 3 presents, in a non-limiting way, a flowchart of the control process for low voltage microgrids with distributed communication CPBC. In the flowchart, there are identified: the system operator who performs the tertiary control of the system called "Distribution System Operator" (DSO), the three-phase central converter (UI), the master control unit (MC) also referenced by the index "L" in the "$\alpha$" coefficients by its Leader function (L) and the distributed generators or GDs.

This technology refers to a control process (CPBC) for three-phase four-wire low-voltage microgrids (MRs). The process is based on two techniques: "Power-Based Control" (PBC) and "consensus protocol" (CP). The proposed technology resorts to PBC and CP techniques to take advantage of the combination of their technical features, achieving a low implementation complexity and concomitantly providing the following technical effects: 1) precise sharing of active power and reactive power proportionally to the capacity of distributed generators (GDs) at the MR; 2) control of the flow of active power and reactive power between the different phases of the MRs; 3) current unbalance compensation at the point of common coupling (PAC).

The control process for low voltage microgrids with distributed communication includes the following steps:

a) Defining the maximum number "n" of GDs that can be installed in each phase;

b) Assigning an individual identification number "i" to each GD;

c) Locally measuring the following magnitudes at each control cycle "l": $P_{UI}(1)$ and $Q_{UI}(1)$ measured at the output of the three-phase central converter (UI); $P_G(1)$ and $Q_G(1)$ measured at the point of common coupling (PAC) on the main grid side; $P_i(1)$ and $Q_i(1)$ measured at the output of each $GD_i$;

d) Sending the measurements $P_{UI}(1)$, $Q_{UI}(1)$, $P_G(1)$, $Q_G(1)$ performed in step "c" to the master control unit (MC);

e) Sending to the master control unit (MC) the values that are associated with each $GD_i$ individually: $P_i(1)$, $Q_i(1)$, and the values $P_{maxi}$ and $A_{invi}$;

f) Estimating, for the current control cycle "l", the total power demand of the microgrid (MR) considering the sum of the portions $$\left[P_G(1) + P_{UI}(1) + \sum_{i=1}^{n} Pi(1)\right] + \left[Q_G(1) + Q_{UI}(1) + \sum_{i=1}^{n} Qi(1)\right],$$

making the estimated value compatible with the maximum power available:

$$\left[\sum_{i=1}^{n} Pmaxi(1)\right];$$

g) Calculating the power flow in the PAC by subtracting from the total power demand, calculated in step "f", the values of $P_G^*$ and $Q_G^*$ obtained from the tertiary control (such as, for example, the "Distribution System Operator"—DSO), and this power flow computation is introduced in the numerators of expressions (1) to (4);

h) Calculating the coefficients of proportionality of the contribution of the power provided by each phase of the MR through its GDs, resulting in the determination of the coefficients referring to the converters of the single-phase GDs ($\alpha_{PLa}$, $\alpha_{PLb}$, $\alpha_{PLc}$) and ($\alpha_{QLa}$, $\alpha_{QLb}$, $\alpha_{QLc}$), applying the expressions (1) and (2), and in the determination of the coefficients referring to the three-phase GD converters ($\alpha_{PLabc}$, $\alpha_{QLabc}$), applying expressions (3) and (4), respectively; calculations are performed on the instance of the leader (L) implemented as (MC);

i) Calculating the proportionality coefficients $\alpha_{Pi}(l+1)$ and $\alpha_{Qi}(l+1)$ of the contribution of active and reactive power, respectively, provided by each $GD_i$ individually as a result of applying the consensus protocol (CP) through equations (5) and (6), performing the current unbalance compensation, if any;

j) Calculating, using equations (7), (8) and (9), the maximum reactive power ($Q_{maxi}$) of each GDi, active power of each GDi individually ($P_i^*$) and reactive power of each GDi individually ($Q_i^*$) for determining the local generation in which the energy contribution of each GDi to the MR occurs proportionally to the individual capacity available in each GDi.

The UI converter, shown in FIGS. 1 and 2, is the element that allows the operation of the MR in islanded mode ("islanded" or IS); the other mode of operation is in connection with the grid, also called "grid connected" or GC. It also acts providing voltage/frequency references for all GDs operating in current control mode.

For single-phase converters together with GDs, each phase is considered individually to promote the compensation of the current unbalance in the PAC and the sharing of active and reactive power.

A communication network (NT) interconnects the adjacent GDs and connects the MC in at least one GD of each phase. Each unit can be both a client and a server. Communication is based on low data transfer speed (i.e., up to a few hundred kbps) and narrow bandwidth (i.e., 9600 to 115200 bps). The MC processes all the information and calculates the scale coefficients, acting as a leader node in the multi-agent system, as exemplified in FIG. 2.

The master control (MC) acts on the PAC and plays the role of master ("leader", leader in the consensus protocol), and each distributed generator (GD) plays the role of slave ("follower", follower in the consensus protocol). Slave units exchange information with each other in a vector structure carrying information from the entire system. That way, after a few iterations, all GDs will have complete grid information.

In the preferred implementation of the CPBC process, information is exchanged between adjacent nodes (GDs) through a data packet allocated in a vector $V_{IF} \in \mathbb{R}^n$. On each of the edges that connect the active nodes (GDs), there is a data flow, in the form of packets, with a dimension of 4×n, where 4 represents the number of variables ($P_i(1)$, $Q_i(1)$, $P_{maxi}$ and $A_{invi}$), whose measures are present in the data and n is the number of GDs, which may vary according to the controlled MR.

The data of each GD, are allocated in vector $V_{IFi}$ in the line corresponding to the individual identifier number "i" for each $GD_i$. This vector is shared between adjacent agents (GDs), which are the GDs that make up the active nodes, and is processed in the receiving agent and inserted into a matrix $M_{IF} \in \mathbb{R}^{n \times n}{}_{aij}$ in column "i". In the filled matrix $M_{IF}$, the received values are compared with each other, column by column. The quantity values referring to adjacent agents only replace the old ones in the vector updated in the control cycle (l+1). If the agent receives data referring to agents that are not adjacent, receiving them indirectly by the adjacent units, proceed according to the following conditions: 1) all adjacent agents report the same value, this value is placed in the vector updated in the control cycle (l+1); 2) the adjacent agents inform different values in relation to the same GD, the average of the received values is inserted in the vector updated in the control cycle (l+1).

The present invention can be better understood through the non-limiting examples below.

Example 1—Computer Simulations

Simulations were carried out for the proposed process based on the technique now conceived and called "Consensus-PBC" (CPBC). The computational simulations were carried out in the time domain and implemented in a Matlab/Simulink computer program considering the circuit of the MR of FIG. 1 and the steps from "α" to "j" described in the control process for low voltage microgrids with distributed communication presented in the section "Detailed description of the technology". Such a circuit is part of a real urban distribution system of low voltage with the parameters available in more detail in Caldognetto et al. (2015). Non-linear loads (NL) are connected according to FIG. 1, resulting in a total MR demand of approximately [36:0, 38:0, 32:0] kW and [15:0, 14:0, 12:0] kVAr on phases a, b and c.

The GDs are randomly located and arbitrarily connected in line-neutral or line-line connection forms, which is a real need in Brazilian NTs. The aggregate power of the GDs is $A_{inv}$=[36:33:0, 36:33, 37:33] kVA and $P_{max}$=[30:0 32:0 32:0] kW. They are modeled as ideal controlled current sources, since primary control is not the main focus of this approach. In addition to the UI, all GDs operate in current control mode. The parameters of the GDs are shown in Table 1.

TABLE 1

Parameters of the Distributed Generators (GDs) of the simulated Microgrid (MR).

| Parameters | GDs |
| --- | --- |
| Identification (i) | [1a, 2a, 3a, 4a, 5a, 1b, 2b, 3b, 1c, 2c, 3c, 4c, 1abc, 2abc, 3abc] |
| Node | [05, 08, 15, 30, 26, 20, 43, 31, 06, 11, 32, 37, 16, 28, 44] |
| Connection | [ab, an, an, ab, an, bn, bc, bn, cn, cn, ca, cn, abcn, abcn, abcn] |
| $A_{inv}$ (kVA) | [3.0, 4.0, 5.0, 5.0, 8.0, 8.0, 8.0, 9.0, 8.0, 5.0, 6.0, 7.0, 10.0, 10.0, 14.0] |
| $P_{max}$ (kW) | [2.0, 3.0, 4.0, 4.0, 7.0, 7.0, 7.0, 8.0, 7.0, 4.0, 5.0, 6.0, 10.0, 8.0, 12.0] |

The simulations included three case studies: case 1: power sharing, case 2: "plug-and-play" capability, case 3: operation with communication failures, and case 4: communication delays.

These cases denote real conditions that may occur during operation in the MR, such as GC and IS operating modes, as well as the transitions between them, PAC power flow control, PAC unbalance current compensation, loop or radial topology, load variations, including non-linear loads, different communication failures, "plug-and-play" operation of GDs and communication delays. For an urban MR with short distances, there is considered a delay time of 1 ms on each communication link throughout the simulation in cases 1, 2 and 3 (a and b), unless otherwise indicated as in the specific study of communication delays in case 4, where this subject is discussed in detail.

Table 2 describes the operational conditions referring to case 1; in this table, the events triggered for the simulation of studied case 1 are also identified and temporally referenced, in which the focus of the analysis is the power sharing.

TABLE 2

Operating conditions referring to case 1.

| Time (s) | Operating Conditions |
| --- | --- |
| 0.35 | GC mode; $CB_1$ and $CB_2$ closed, $CB_{UI}$ closed; radial topology: $CB_3$ and $CB_4$ open; All connected GDs: all Sn switches closed; $P_G^*$ = [8.0, 10.0, 12.0] kW, $Q_G^*$ = [4.0, 3.0, 1.0] kVAr; |
| 0.50 | $P_G^*$ = [15.0, 15.0, 15.0] kW, $Q_G^*$ = [2.0, 2.0, 2.0] kVAr; Intentional operation in islanded mode: |
| 1.00 | $P_G^*$ = [0, 0, 0] kW, $Q_G^*$ = [0, 0, 0] kVAr; |
| 1.05 | opening of $CB_1$; |
| 1.10 | opening of $CB_2$; |
| 1.25 | Meshed topology: $CB_3$ and $CB_4$ closed. |
| 1.50 | Connection of non-linear loads. GC mode: $CB_2$ closed; |
| 2.00 | $CB_1$ closed; |
| 2.05 | $P_G^*$ = [15.0, 15.0, 15.0] kW, $Q_G^*$ = [2.0, 2.0, 2.0] kVAr; |
| 2.10 | |

Table 3 describes the operational conditions referring to case 2; in this table, the events triggered for the simulation of studied case 2 are also identified and temporally referenced, in which the focus of the analysis is the operation in the "plug-and-play" condition.

TABLE 3

Operating conditions referring to case 2.

| Time (s) | Operating Conditions |
| --- | --- |
| 0.35 | IS mode: $CB_1$ and $CB_2$ open, $CB_{UI}$ closed; Meshed topology: $CB_3$ and $CB_4$ closed; All GDs connected: all Sn switches closed; $P_G^*$ = [0, 0, 0] kW, $Q_G^*$ = [0, 0, 0] kVAr; |
| 1.00 | Disconnection of $GD_{2a}$ and $GD_{1b}$; |
| 1.50 | $GD_{3a}$ no longer participates in the consensus protocol; Reconnection of $GD_{1b}$; |
| 2.00 | $GD_{3a}$ requests participation in the consensus protocol; Reconnection of $GD_{2a}$; |

Table 4 describes the operational conditions referring to case 3, in this table the events triggered for the simulation of studied case 3 are also identified and temporally referenced, in which the focus of the analysis is the operation with communication failures.

TABLE 4

Operating conditions referring to case 3.

| Time (s) | Operating Conditions |
| --- | --- |
| 0.35 | IS mode: $CB_1$ and $CB_2$ open, $CB_{UI}$ closed; Meshed topology: $CB_3$ and $CB_4$ closed; All GDs connected: all "Sn" switches closed; $P_G^*$ = [0, 0, 0] kW, $Q_G^*$ = [0, 0, 0] kVAr; |
| Case 3(a) | Failures in communication of phase a GDS; |
| 1.00 | Failures in communication in the connection between $GD_{1a}$ and $GD_{2a}$; |
| 1.50 | Reestablishment of connection between $GD_{1a}$ and $GD_{2a}$; Failures in communication in the connection between $GD_{3a}$ and $GD_{4a}$; |
| 2.00 | Reestablishment of connection between $GD_{3a}$ and $GD_{4a}$; |
| Case 3(b) | Failures in communication of phase b GDS; |

TABLE 4-continued

Operating conditions referring to case 3.

| Time (s) | Operating Conditions |
|---|---|
| 1.00 | Failures in communication in the connection between $GD_{1b}$ and $GD_{2b}$; |
| 1.50 | Reestablishment of connection between $GD_{1b}$ and $GD_{2b}$; Failures in communication in the connection between $GD_{2b}$ and $GD_{3b}$; |
| 2.00 | Reestablishment of connection between $GD_{2b}$ and $GD3b$; |

Simulation Results of Case 1 (Power Sharing)

The initial condition of the circuit that represents the simulated MR is the one shown in FIG. 1, that is, the mode is GC enabled, UI connected, radial topology, linear loads connected and all GDs connected and participating in the consensus of the CPBC process. This scenario is the starting point of the simulation of case 1 (power sharing), whose result is shown in FIGS. 5, 6A-6D, and 7A-E.

Figure 5:
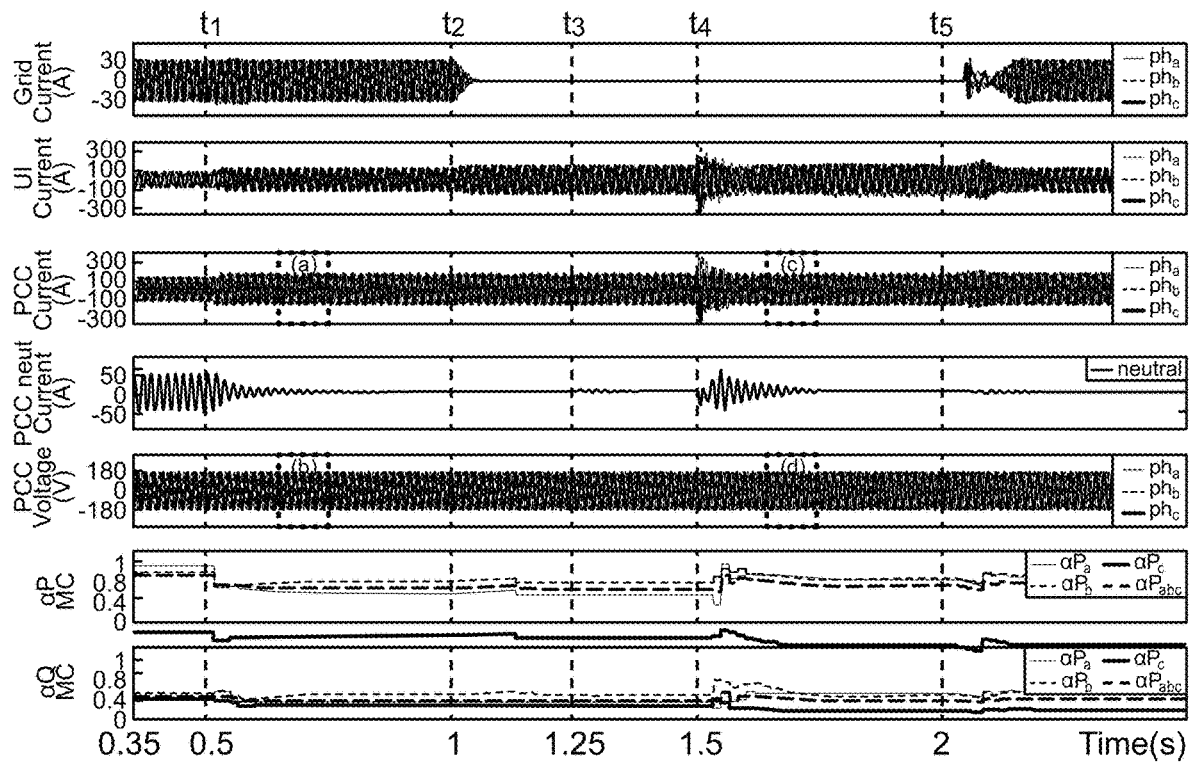
FIG. 5 presents, in a non-limiting way, the result of the simulation of case 1 (power sharing) in which the contribution of the main grid and UI for energy sharing, as well as the line and neutral currents are shown ($I_{PAC}=I_{Rede}+I_{UI}$) and voltage waveform in the PAC. The contribution of the GDs is demonstrated by the Consensus-PBC by the coefficients αP and αQ, for single-phase and three-phase GDs. Indications a, b, c, and d show graphic elements that will be detailed in FIG. 6A-6D. The time instants $t_1$, $t_2$, $t_3$, $t_4$ and $t_5$ are also identified.
Figure 6A:
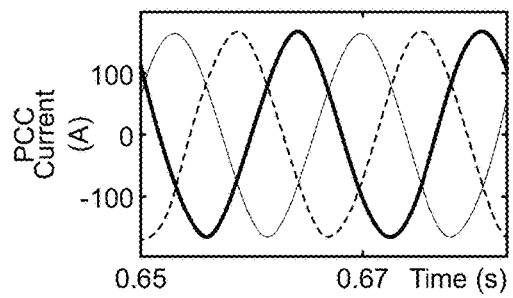
FIG. 6A presents, in a non-limiting way, the result of the simulation of case 1 (power sharing), in the form of a graph, in which the waveform section indicated by a dashed box (a) in FIG. 5 is illustrated and was measured before the connection of non-linear loads and before the load step applied to the system at 1.50 s.
Figure 6C:
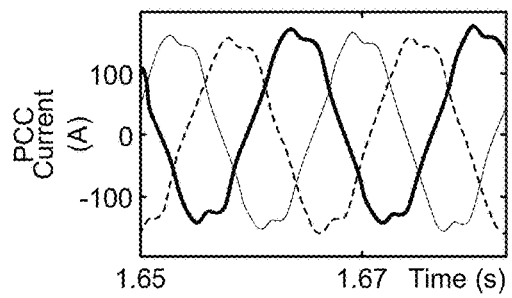
FIG. 6C presents, in a non-limiting way, the result of the simulation of case 1 (power sharing), in the form of a graph, in which the waveform section indicated by a dashed box (c) in FIG. 5 is illustrated and was measured after the mentioned connections, which is evidenced by the distortions observed in the current in the PAC.
Figure 6B:
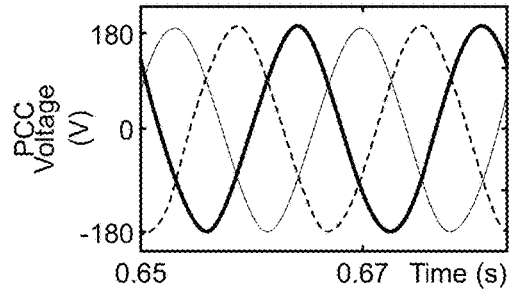
FIG. 6B presents, in a non-limiting way, the result of the simulation of case 1 (power sharing), in the form of a graph, in which the waveform section indicated by a dashed box (b) in FIG. 5 is illustrated and was measured before the connection of non-linear loads and before the load step applied to the system at 1.50 s.
Figure 6D:
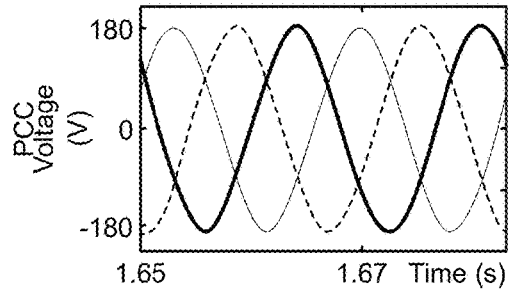
FIG. 6D presents, in a non-limiting way, the result of the simulation of case 1 (power sharing), in the form of a graph, in which the waveform section indicated by a dashed box (d) in FIG. 5 is illustrated and was measured after the mentioned connections, which is evidenced by the distortions observed in the current in the PAC.

FIG. 5 shows the simulation results with the abscissa axis (x) divided into operating conditions according to Table 2. For some cases, only the active power results are shown, but the behavior for the reactive power was as expected and was omitted to simplify the analysis and visualization of the results. It is observed that the CPBC presents a stable operation and smooth transitions between changes in operating conditions.

FIGS. 6A-6D presents, in a non-limiting way, the result of the simulation of case 1 (power sharing), in the form of a graph, in which the waveforms shown in FIG. 5 are detailed. The waveform sections highlighted in FIG. 6A and FIG. 6B were measured before the connection of non-linear loads and before the load step applied to the system in 1.50 s. The waveform sections highlighted in FIG. 6C and FIG. 6D were measured after the mentioned connections, which is evidenced by the distortions observed in the current in the PAC.

Figure 7A:
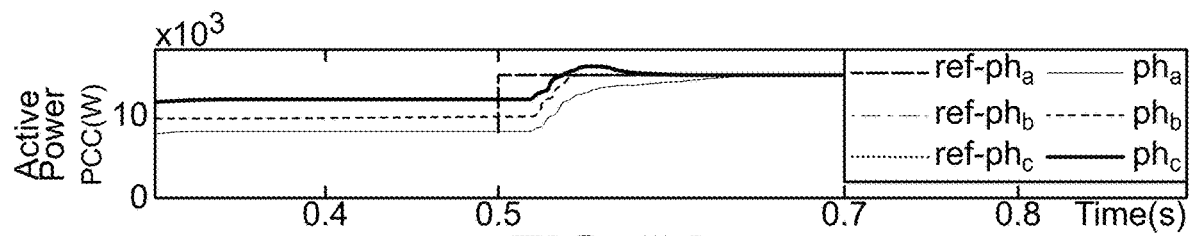
FIG. 7A presents, in a non-limiting way, the result of the simulation of case 1 (power sharing), in the form of a graph, in which waveforms are detailed and shows the active power in the PAC.
Figure 7B:
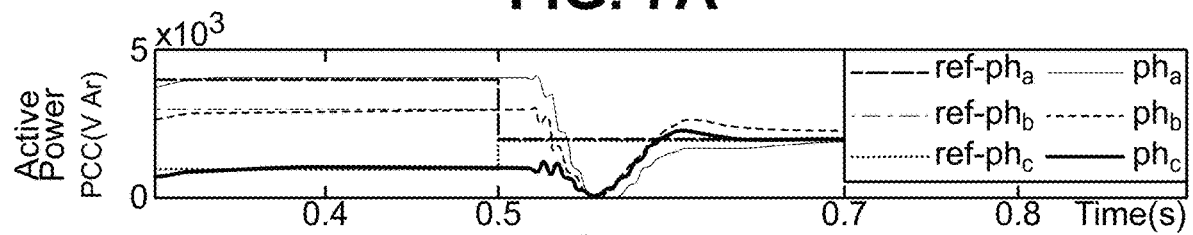
FIG. 7B presents, in a non-limiting way, the result of the simulation of case 1 (power sharing), in the form of a graph, in which a waveform is detailed and shows the reactive power in the PAC.
Figure 7C:
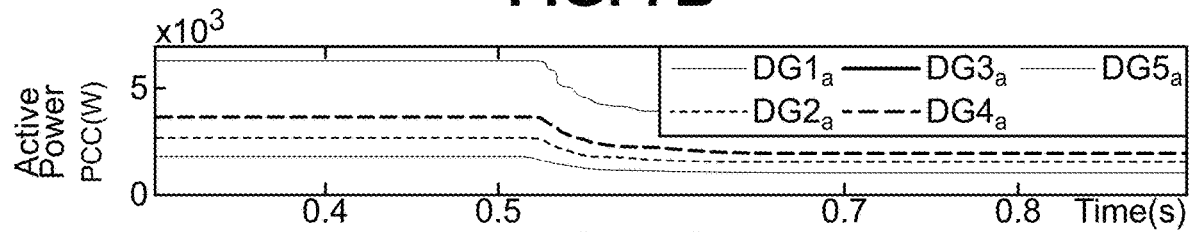
FIG. 7C presents, in a non-limiting way, the result of the simulation of case 1 (power sharing), in the form of a graph, in which waveforms are detailed and the active power sharing of the connected single-phase GDs proportionally to their capacities are illustrated.
Figure 7D:
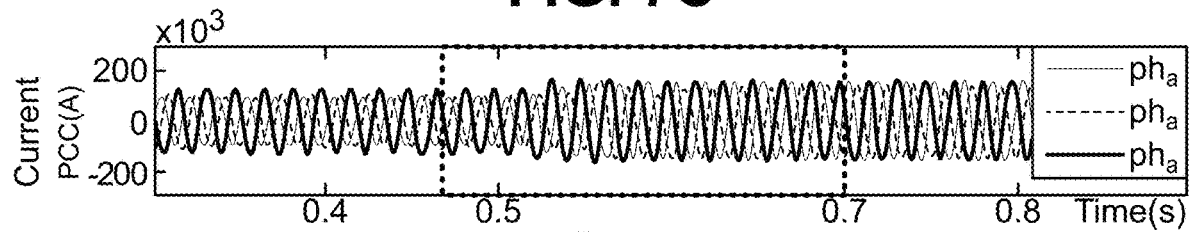
FIG. 7D presents, in a non-limiting way, the result of the simulation of case 1 (power sharing), in the form of a graph, in which waveforms are detailed and shows the moment $t_1$, in which a balanced power flow reference is defined for the PAC and the unbalance compensation occurs, which can also be associated with the reduction of the PAC neutral current shown in the graph in FIG. 7E.
Figure 7E:
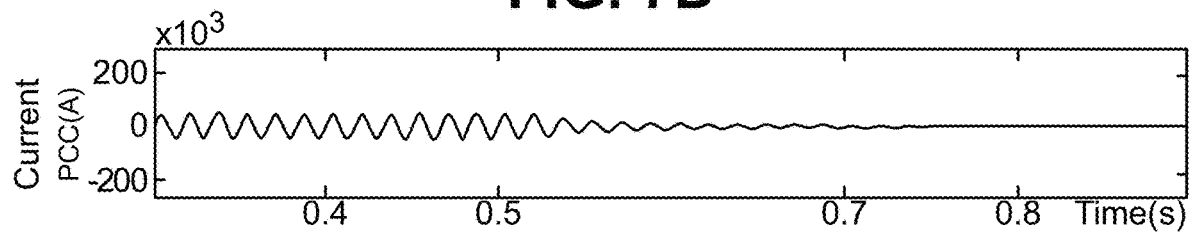
FIG. 7E presents, in a non-limiting way, the result of the simulation of case 1 (power sharing), in the form of a graph, illustrating the reduction of the PAC neutral current.
Figure 8:
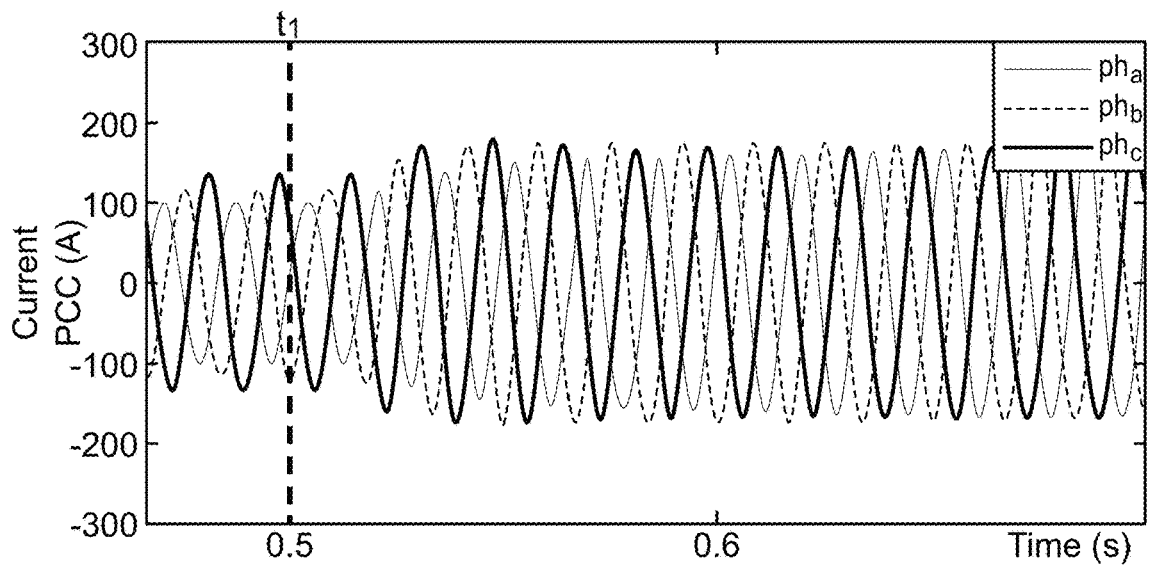
FIG. 8 presents, in a non-limiting way, the result of the simulation of case 1 (power sharing), in the form of a graph, in which the waveforms shown in FIG. 7D are enlarged and detailed.

FIGS. 7A and 7B show how the active and reactive powers in the PAC are precisely controlled, following the change in the power flow reference at instant 0.50 s. The graph presented in FIG. 7C shows the active power sharing of the single-phase GDs connected to phase a in proportion to their capacities, as specified in Table 1. For example, generators $GD_{3a}$ and $GD_{4a}$ have the same nominal power, so they are commanded to provide the same active power for MR. When a balanced power flow reference is set to PAC at $t_1$, unbalance compensation at this node occurs in 7($d$), which has been enlarged and shown in FIG. 8, which is also evidenced by the reduction of the PAC neutral current in FIG. 7E.

Figure 9A:
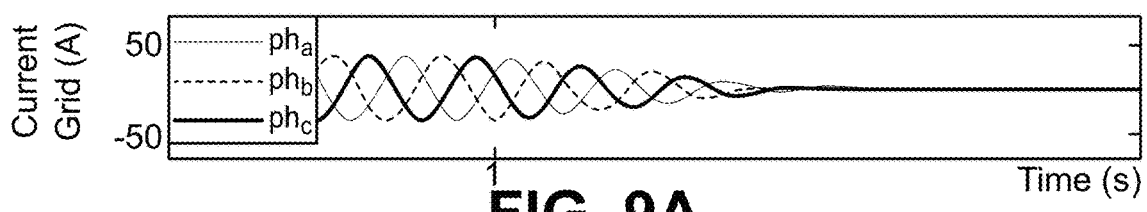
FIG. 9A presents, in a non-limiting way, the result of the simulation of case 1 (power sharing), in the form of a graph, in which the IS operation mode started at instant 1.00 s is detailed in the graph of FIG. 5. The contribution of the GDs is demonstrated by the Consensus-PBC by the Grid Current (A), for three-phase GDs.
Figure 9B:
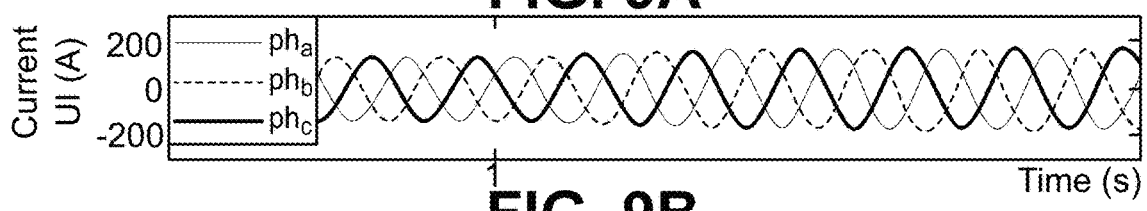
FIG. 9B presents, in a non-limiting way, the result of the simulation of case 1 (power sharing), in form of a graph, in which the IS operation mode started at instant 1.00 s is detailed in the graph of FIG. 5. The contribution of the GDs is demonstrated by the Consensus-PBC by the UI Current (A), for three-phase GDs.
Figure 9C:
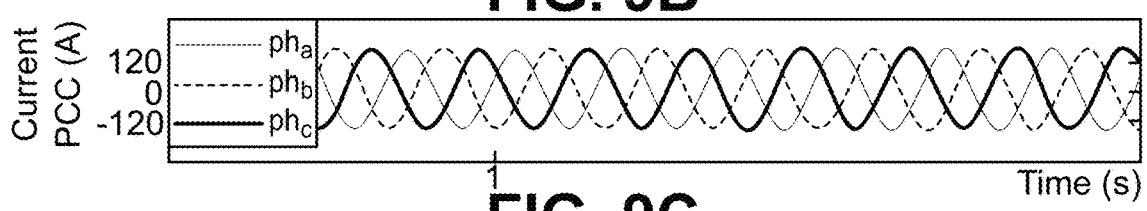
FIG. 9C presents, in a non-limiting way, the result of the simulation of case 1 (power sharing), in form of a graph, in which the IS operation mode started at instant 1.00 s is detailed in the graph of FIG. 5. The contribution of the GDs is demonstrated by the Consensus-PBC by the PCC Current (A), for three-phase GDs.
Figure 9D:
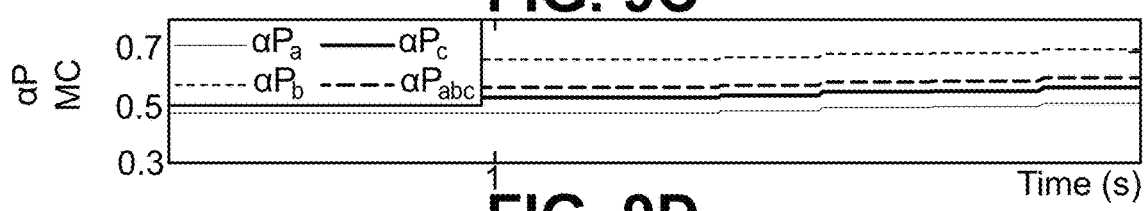
FIG. 9D presents, in a non-limiting way, the result of the simulation of case 1 (power sharing), in form of a graph, in which the IS operation mode started at instant 1.00 s is detailed in the graph of FIG. 5. The contribution of the GDs is demonstrated by the Consensus-PBC by the coefficient αP, for single-phase and for three-phase GDs.
Figure 9E:
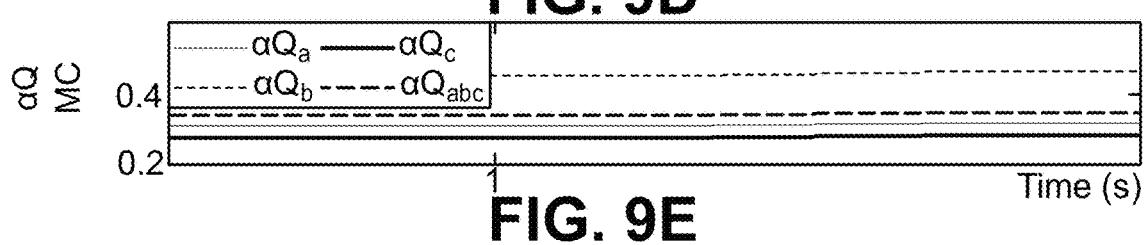
FIG. 9E presents, in a non-limiting way, the result of the simulation of case 1 (power sharing), in form of a graph, in which the IS operation mode started at instant 1.00 s is detailed in the graph of FIG. 5. The contribution of the GDs is demonstrated by the Consensus-PBC by the coefficient αQ, for single-phase and three-phase GDs.

In case 1, the MR is subjected to different modes of operation, such as the IS mode from 1.00 s, as indicated by the dashed lines in FIG. 5. This mode of operation can be seen in greater detail in FIGS. 9A-9C, which presents the currents of grid and UI ($I_{REDE}$ and $I_{UI}$), as well as the currents in the PAC during this transition, respectively shown in FIG. 9A, FIG. 9B, FIG. 9C. The UI converter operates as a reference to the grid throughout the IS mode, providing the necessary voltage reference for the MR. At $t_5$ in FIG. 5, the MR reconnection to the main grid starts. It is observed that, in both operating modes (GC and IS), as well as during transitions, the system also reacts smoothly, in a stable and safe condition.

Simulation Results of Case 2 ("Plug-and-Play" Operation)

In the simulation of case 2 that evaluates the "Plug-and-Play" capability, two different scenarios are considered: (I) when the GD is participating in the consensus in the CPBC process, but disconnects from the MR for any reason and reconnects later; and (II) when the GD operator decided not to participate in the consensus of CPBC process and subsequently revokes its decision. In both cases, it is considered that the communication links are still available and operating.

Figure 10:
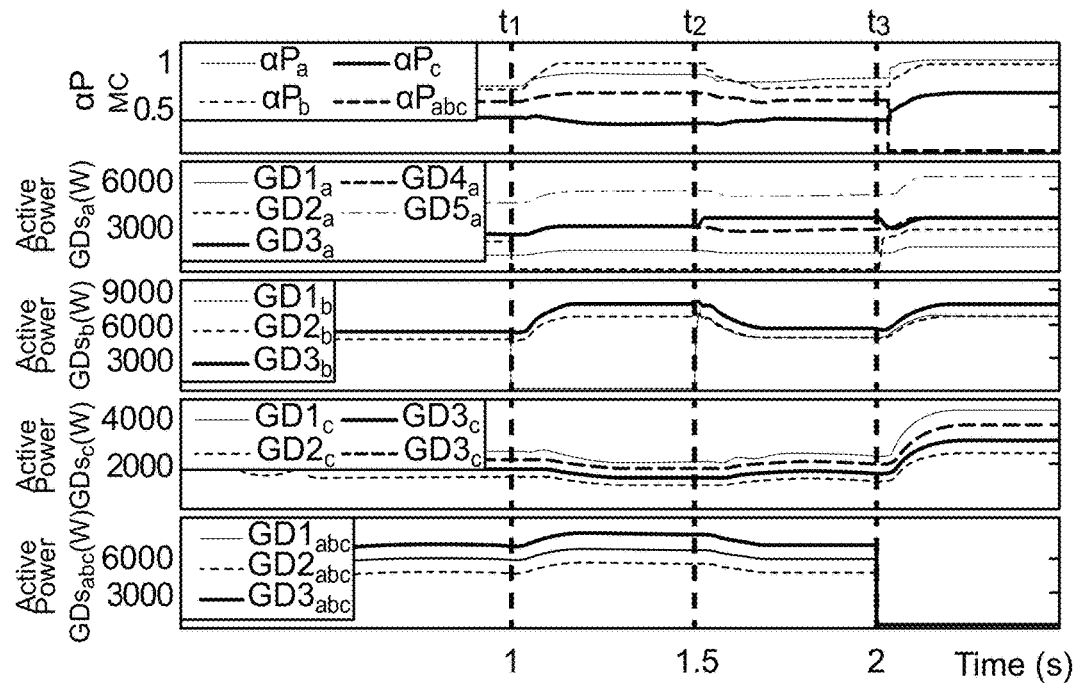
FIG. 10 presents, in a non-limiting way, the result of the simulation of case 2 (Plug-and-Play capacity), in the form of a graph, in which it is possible to verify all the coefficients related to the sharing of active power and the active power of the single-phase and three-phase GDs, in all phases according to the conditions of table 3.

In scenario (I), the disconnected GDi reports zero availability in the exchange of information with the MC (illustrated as step B in FIG. 3); in the simulation (according to table 3), this behavior is exemplified when $GD_{2a}$ disconnects from the system (or has no energy available) in the interval from 1.00 to 2.00 s and $GD_{1b}$ disconnects from 1.00 to 1.50 s, as shown in FIG. 10, where it is also possible to check all the coefficients related to the sharing of active power and the active power itself on all phases.

When $GD_{2a}$ and $GD_{1b}$ disconnect, the coefficient of these phases increases to compensate for the loss of energy availability and, in parallel, the other GDs still continue to operate. The opposite is observed when these GDs reconnect to the system.

Figure 11:
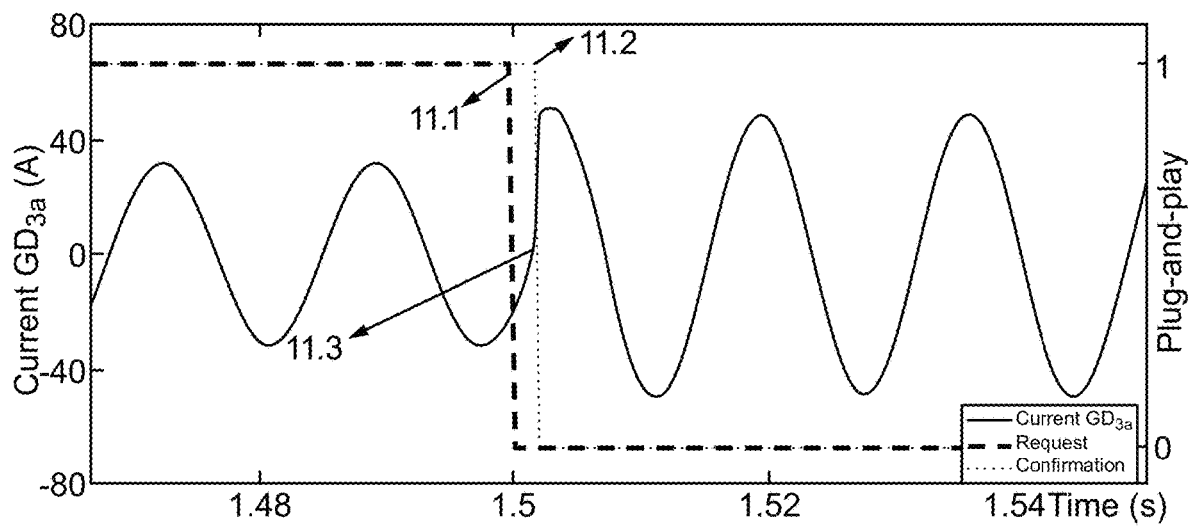
FIG. 11 presents, in a non-limiting way, the result of the simulation of case 2 (Plug-and-Play capability), in the form of a graph, in which it is possible to observe a detail referring to instant 1.5 ($t_2$) of the graph in FIG. 10. In this detail, the following sequence of events can be seen: 11.1) indicates, on the black dashed line, the sending of a request signal by $GD_{3a}$ to adjacent GDs to join the consensus of the CPBC process; 11.2) by means of the connections of $GD_{3a}$ to adjacent GDs, the identification of $GD_{3a}$ is verified and permission is granted for $GD_{3a}$ to participate in the consensus of the CPBC process, as indicated by the dashed line in green; 11.3) after the participation permission granted by the adjacent units $GD_{1a}$ and $GD_{4a}$, which was confirmed by $GD_{3a}$, then starts the participation of $GD_{3a}$ in the consensus of the CPBC process that immediately causes the circulation of current that is indicated by the blue line.

In scenario (II), a request signal is sent by the GD to all its adjacent agents when there is some change in its decision to participate in the consensus of the CPBC process, as occurred at instant 1.50 s for $GD_{3a}$ in FIG. 10. As soon as this GD receives confirmation from all adjacent neighbors, it is able to participate or leave the energy sharing, being controlled by the CPBC process (as detailed in FIG. 11).

If the GD does not participate in the consensus of CPBC process, but is available and connected to the power system, its generation is defined as $\alpha P=1$ and $\alpha Q=0$. FIG. 10 shows how the coefficients $\alpha P$ and $\alpha Q$ react to restore the balance of power generation. GD returns at 2.00 s, the coefficients are redefined and $GD_{3a}$ starts to contribute according to the coefficients $\alpha P$ and $\alpha Q$ obtained by the consensus of the CPBC process. Later, when all three-phase GDs disconnect from the system, all sharing coefficients referring to single-phase GDs increase to reestablish the power sharing.

Simulation Results of Case 3 (Communication Failures)

Figure 12:
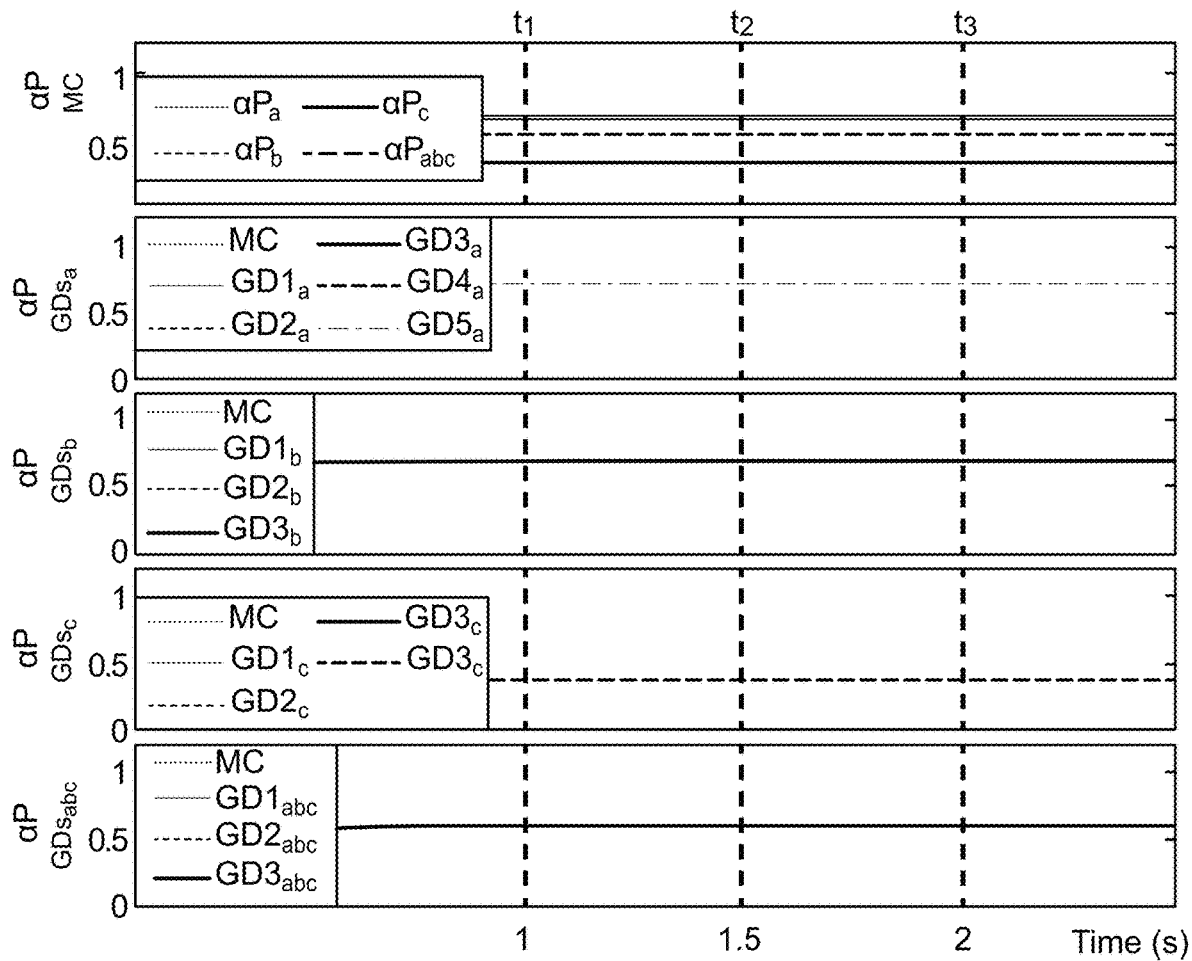
FIG. 12 presents, in a non-limiting way, the result of the simulation of case 2 (Communication Failures), in the form of a graph, in which it is possible to observe the evolution of the coefficients αP for the simulation scenario described as case (a) in table 4.

To analyze the behavior of the system in face of communication failures, the graphs related to phases a and b in FIGS. 2A and 2B are considered as different topologies. In FIG. 2A, we have a graph of strongly connected elements with a cyclic configuration. This means that there is link redundancy that keeps the graph still strongly connected even in the event of a single failure. This condition was simulated in Case 3$a$, as shown in FIG. 12. At instant 1.00 s, there is a failure in the communication link between $GD_{1a}$ and $GD_{2a}$, and, at instant 1.50 s, there is a failure in the communication link between $GD_{3a}$ and $GD_{4a}$. In both failures, the communication path changes, but data still arrives at the MC in the PAC. This results in no changes to the graphs during this interval.

Figure 13:
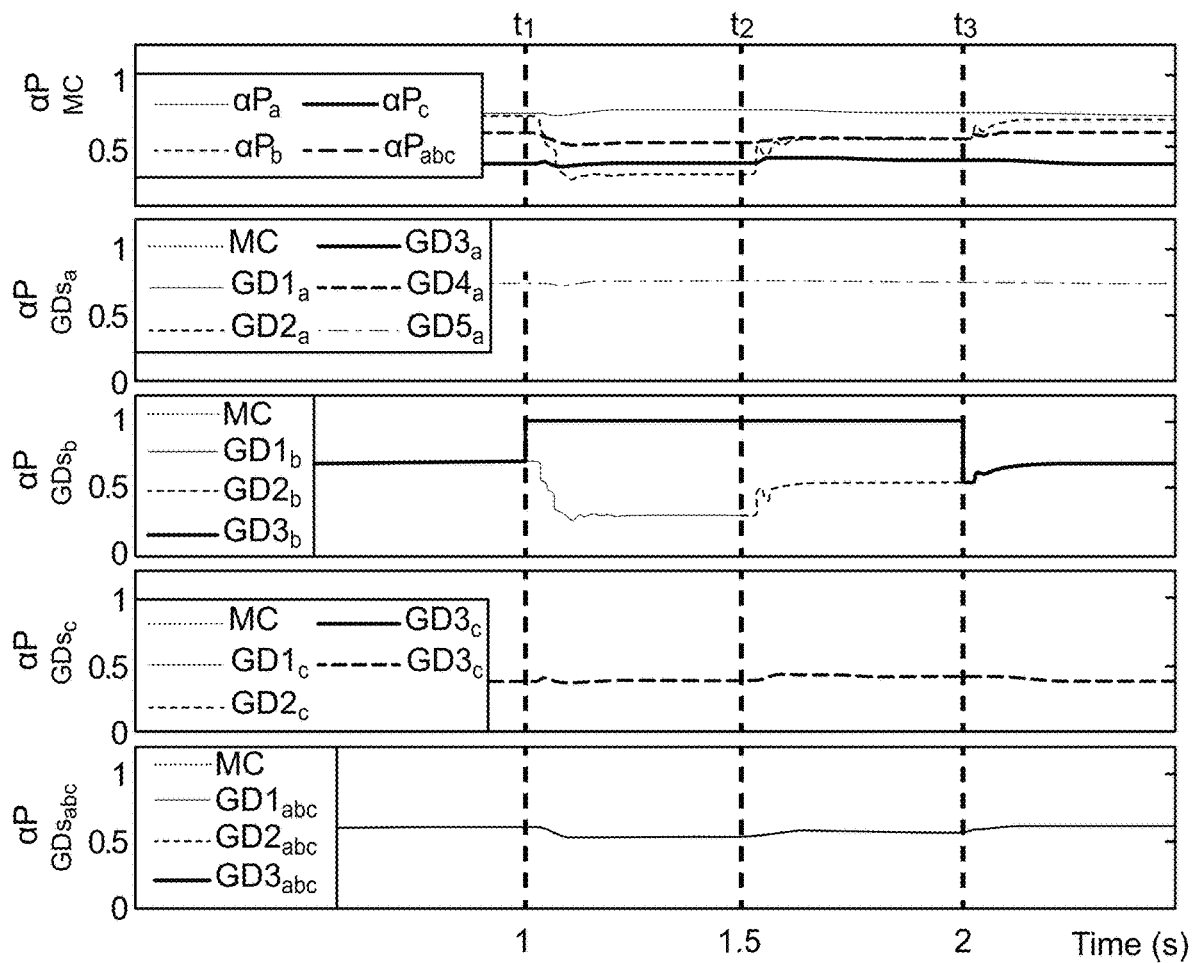
FIG. 13 presents, in a non-limiting way, the result of the simulation of case 2 (Communication Failures), in the form of a graph, in which it is possible to observe the evolution of the coefficients αP for the simulation scenario described as case (b) in table 4.

Analyzing the graph of phase b in FIG. 2B, it is clear that the condition is different. If any of the communication links are out of order, at least one GD will not be reached by all other units and its status will not reach the MC. Thus, the non-strongly connected GDs of the graph that are connected to the MC are configured to inject maximum active power and zero reactive power. The simulation results for Case 3$b$ are shown in FIG. 13. At instant 1.00 s, the communication link between $GD_{1b}$ and $GD_{2b}$ is interrupted and only $GD_{1b}$ is connected to the MC. When this link is reestablished, there is a failure between the communication link between $GD_{2b}$ and $GD_{3b}$, segregating only $GD_{3b}$. Thus, $GD_{2b}$ returns to consensus in the CPBC process ($\alpha P$ increases), while $GD_{3b}$ continues to inject maximum active power with unity power factor.

Note that the total of three-phase GDs is the same as single-phase GDs connected to phase b. However, just for demonstration purposes, a different graph was chosen. In FIG. 2D, a failure of any communication link would exclude all GDs not connected directly to the leader of the control coordination. Thus, a graph as in FIG. 2B can be chosen to increase reliability.

Simulation Results of Case 4 (Communication Delays)

Figure 14A:
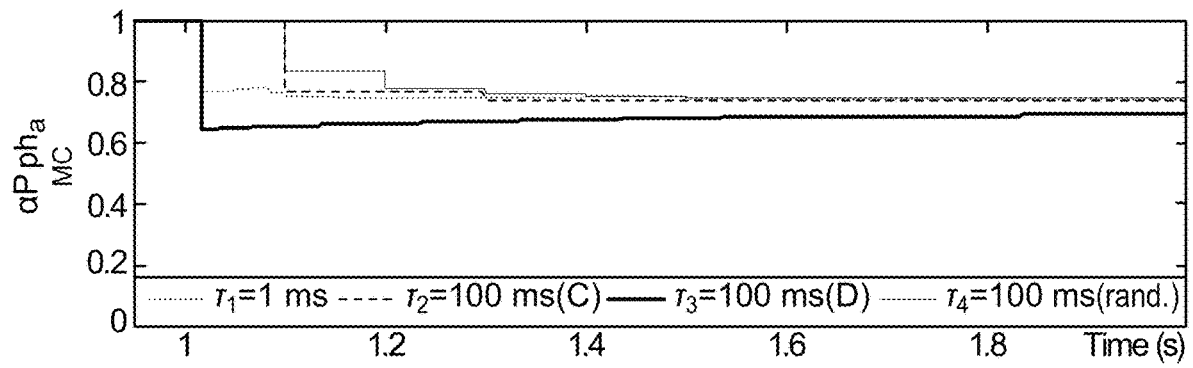
FIG. 14A presents, in a non-limiting way, the result of the simulation of case 2 (Communication Delays), in the form of a graph, in which it is possible to observe the evolution of the coefficient αP for the simulation scenarios that introduce communication delays and reference them in time according to the chronology of the CPBC process described in FIG. 3. The applied delays are 1 ms, 100 ms at the moment (C) identified in the FIG. 3, 100 ms at a random time (indicated as "rand.
Figure 14B:
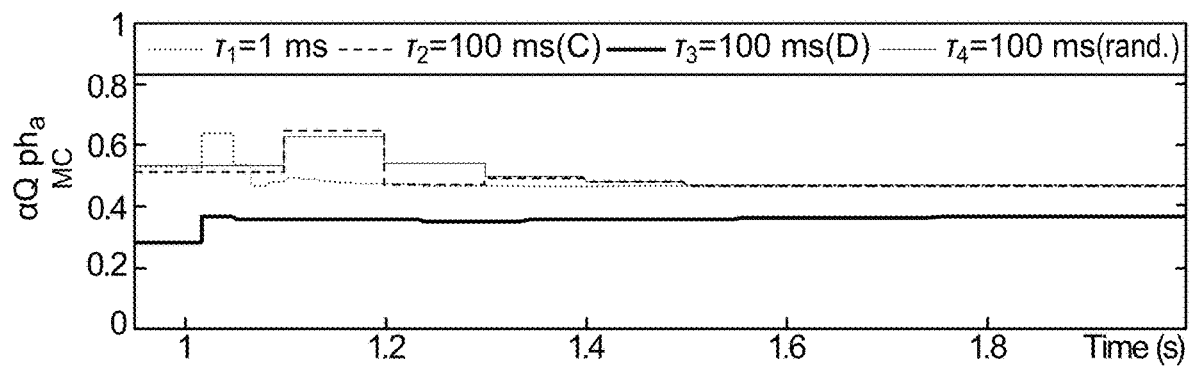
FIG. 14B presents, in a non-limiting way, the result of the simulation of case 2 (Communication Delays), in the form of a graph, in which it is possible to observe the evolution of the coefficient αQ for the simulation scenarios that introduce communication delays and reference them in time according to the chronology of the CPBC process described in FIG. 3. The applied delays are 1 ms, 100 ms at the moment (C) identified in the FIG. 3, 100 ms at a random time (indicated as "rand.

In case 4, operational situations were simulated in which there were communication delays, in order to know the behavior of the system controlled by the CPBC process. The simulation scenarios consider the IEC 61850 requirements, which mentions delay intervals of 100 ms. The simulation results are shown in FIGS. 14A and 14B.

In each scenario, the delay is applied throughout the simulation time, which is more critical than random delays in real applications. As shown in FIGS. 14A and 14B, scenario 1 considers a delay of $\tau_1=1$ ms in all communication links in the system and in all steps of the algorithm, scenario 2 includes a delay of $\tau_2=100$ ms in all links during the data processing and data transfer from the MC to the GDs in step C mentioned in FIG. 3, and, in scenario 3, there is a delay of $\tau_3=100$ ms on all links during the consensus protocol in step D mentioned in FIG. 3. Finally, in scenario 4, a delay of $\tau_4=100$ ms was inserted in some random links in the MR and in different steps of the algorithm, in order to simulate a more realistic condition. FIGS. 14A and 14B show that, despite different convergence times between the scenarios, with the exception of scenario 3, similar final values are reached. When all links of the consensus protocol suffer a delay of 100 ms, the final value differs from the other scenarios, but still remains stable.

The invention claimed is:

1. A method for controlling a microgrid comprising a plurality of distributed generators, the plurality of distributed generators comprising single-phase distributed generators and three-phase distributed generators, the method comprising, at a master control unit of the microgrid:
receiving measurements corresponding to active power measured at an output of a three-phase central converter, reactive power measured at the output of the three-phase central converter, active power supplied by a main grid, reactive power supplied by the main grid, active power measured at an output of each distributed generator, reactive power measured at the output of each distributed generator, a maximum power provided by each distributed generator, and a nominal power of a converter of each distributed generator;
determining a total power demand of the microgrid based on the received measurements;
determining a power flow at a point of common coupling between the microgrid and the main grid based on the total power demand, an active power reference obtained from the main grid, and a reactive power reference obtained from the main grid;
determining a proportion of the total power demand provided by the single-phase distributed generators and a proportion of the total power demand provided by the three-phase distributed generators based on the determined power flow at the point of common coupling;
determining a proportion of active and reactive power, respectively, provided by each distributed generator of the plurality of distributed generators;
determining a maximum reactive power of each distributed generator, an active power of each distributed generator, and a reactive power of each distributed generator to determine an energy contribution of each distributed generator to the microgrid that is proportional to a capacity of the respective distributed generator; and
controlling a flow of power within the microgrid in accordance with the determined energy contribution of each distributed generator.

2. The method of claim 1, wherein the three-phase central converter causes the microgrid to operate in an islanded mode or in a grid-connected mode.

3. The method of claim 1, wherein controlling the flow of power within the microgrid comprises compensating for a current imbalance at the point of common coupling, wherein compensating for the current imbalance comprises reducing a neutral current at the point of common coupling.

4. The method of claim 1, wherein a communication network interconnects adjacent distributed generators and connects the master control unit to at least one single-phase distributed generator and at least one three-phase distributed generator.

5. The method of claim 1, wherein the plurality of distributed generators exchange information with each other in a vector structure, such that each distributed generator of the plurality of distributed generators receives information about each other distributed generator of the plurality of distributed generators.

6. The method of claim 1, wherein adjacent distributed generators exchange data packets, wherein each data packet comprises a vector structure that includes information about the plurality of distributed generators.

7. The method of claim 1, wherein data corresponding to each distributed generator is included in a vector structure that is shared between adjacent distributed generators, wherein a distributed generator that receives the vector structure is configured to update the vector structure.

* * * * *